US009651414B2

(12) United States Patent
Hofer et al.

(10) Patent No.: US 9,651,414 B2
(45) Date of Patent: May 16, 2017

(54) FILLING DEVICE AND METHOD FOR DETECTING A FILLING PROCESS

(71) Applicant: MULTIPOND Wägetechnik GmbH, Waldkraiburg (DE)

(72) Inventors: Franz Hofer, Ampfing (DE); Florian Hübel, Waldkraiburg (DE); Wolfram C. Zeck, Mühldorf (DE)

(73) Assignee: MULTIPOND WÄGETECHNIK GMBH, Waldkraiburg (DE)

( * ) Notice: Subject to any disclaimer, the term of this patent is extended or adjusted under 35 U.S.C. 154(b) by 125 days.

(21) Appl. No.: 14/576,387

(22) Filed: Dec. 19, 2014

(65) Prior Publication Data

US 2015/0177052 A1   Jun. 25, 2015

(30) Foreign Application Priority Data

Dec. 20, 2013   (EP) ..................................... 13199149

(51) Int. Cl.
*G01G 19/393* (2006.01)
*G01F 13/00* (2006.01)
(Continued)

(52) U.S. Cl.
CPC ......... *G01G 19/387* (2013.01); *G01G 11/003* (2013.01); *G01G 19/393* (2013.01); *G01G 23/3721* (2013.01); *G01F 13/00* (2013.01)

(58) Field of Classification Search
CPC .. G01G 19/387; G01G 19/393; G01G 11/003; G01G 23/3721; G01F 1/002; G01F 13/00
(Continued)

(56) References Cited

U.S. PATENT DOCUMENTS 4,992,929 A * 2/1991 Yamada ................. G01G 13/16
                                                                     177/177
5,084,832 A * 1/1992 Yamada ................. G01G 13/16
                                                                    177/25.18
(Continued)

FOREIGN PATENT DOCUMENTS

DE          4230626 A1     3/1994
JP       2006-234395 A     9/2006
JP       2013-195125 A     9/2013

OTHER PUBLICATIONS

Computer translation of DE 423026 from the EPO website. Jun. 15, 2016.*

(Continued)

*Primary Examiner* — Randy Gibson
(74) *Attorney, Agent, or Firm* — Hassan Abbas Shakir; Katten Muchin Rosenman LLP

(57) ABSTRACT

A filling device for a weighing device includes a loading device for the feeding of products, a transport area, which is supplied with products from the loading device, at least one sensor for capturing and forwarding of product occupation information on the transport area, and a control means. The at least one sensor is thereby formed to capture at least a partial area of the transport area and the control means is formed to divide the area captured by the at least one sensor virtually in a multiplicity of sectors. Further, a method for performing of a monitoring and capturing process of a filling of a filling device is disclosed.

20 Claims, 6 Drawing Sheets

(51) Int. Cl.
*G01G 19/387* (2006.01)
*G01G 11/00* (2006.01)
*G01G 23/37* (2006.01)

(58) Field of Classification Search
USPC .......................................................... 33/1 V
See application file for complete search history.

(56) References Cited

U.S. PATENT DOCUMENTS

| | | | | |
|---|---|---|---|---|
| 5,270,495 A | * | 12/1993 | Mosher | G01G 13/026 177/25.18 |
| 5,289,205 A | * | 2/1994 | Torres | G06F 3/04855 345/685 |
| 5,502,898 A | * | 4/1996 | Manore | G01C 15/002 177/1 |
| 5,753,866 A | * | 5/1998 | Ikeda | G01G 19/393 177/25.18 |
| 6,211,470 B1 | * | 4/2001 | Beran | G01G 11/003 177/119 |
| 8,350,847 B2 | | 1/2013 | Shpunt | |
| 2004/0201587 A1 | * | 10/2004 | Mizusawa | G06T 15/20 345/427 |
| 2008/0091299 A1 | * | 4/2008 | Yoshikawa | B65B 9/213 700/242 |
| 2011/0292036 A1 | | 12/2011 | Sali et al. | |
| 2012/0056982 A1 | | 3/2012 | Katz et al. | |
| 2012/0075534 A1 | | 3/2012 | Katz et al. | |
| 2015/0021103 A1 | | 1/2015 | Tamai et al. | |

OTHER PUBLICATIONS

Computer translation of JP 2006-234395 from the JPO website. Jun. 15, 2016.*
Computer translation of JP 2013-195125 from the JPO website. Jun. 15, 2016.*
Extended European Search Report dated Feb. 21, 2014 for the Corresponding European Patent Application No. 13199149.9.
European Office Action dated Mar. 10, 2015 for the Corresponding European Patent Application No. 13199149.9.

* cited by examiner

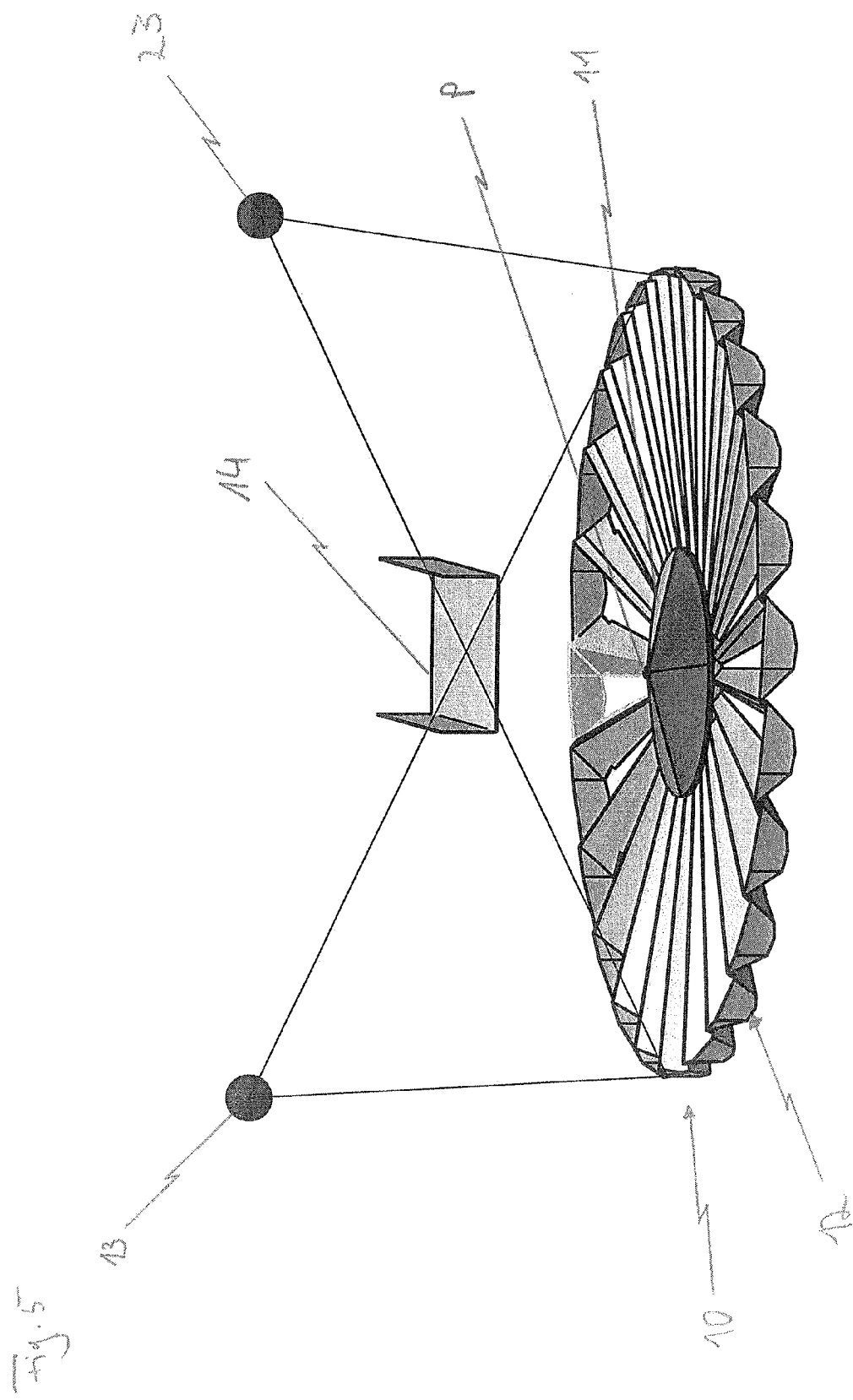

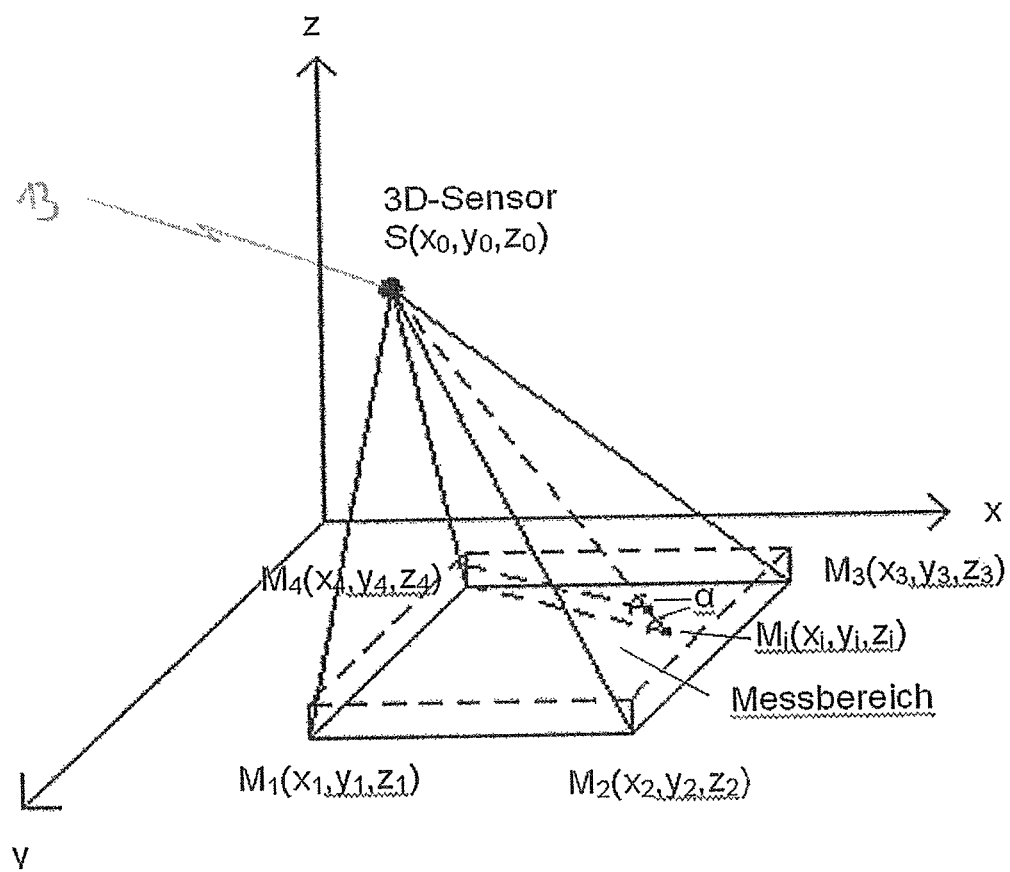

FILLING DEVICE AND METHOD FOR DETECTING A FILLING PROCESS

BACKGROUND OF THE INVENTION

1. Field of the Invention

The present invention relates to a filling device, especially for a weighing device, and to a process for capturing a filling.

2. Description of the Related Art

In installation engineering, different products have often to be handled. Thereby, the products are transported, stored, distributed, sorted, processed and weighed between and within different machines.

In many cases of installation engineering, so for example at weighing devices, a monitoring of different transport paths should be performed. Thereby changes in the transport behaviour, for example changes regarding a flow, an average filling amount or the like should be captured. The nature of the product is thereby often not homogenous and the single products can be from granular to coarse; their shape can be uneven and the physical properties can vary.

In addition, there is the unpredictable behaviour of the transportability by interacting of the single pieces via adhering, wedging or clumping. In practice, that leads to the disturbance of the even product distribution on a transport area. Local accumulations of product or gaps can arise. In unfavourable cases, a transport in intended transport grooves can be locally total blocked and the groove can run dry. Thereby, also the product feed in adjacent grooves can be disturbed, and the initial distribution can also be limited. Under certain circumstances, such an accumulation at an end of the groove can pretend a complete filling and can completely prevent a refilling. Consequently, this leads to an undersupply of all other transport grooves.

The results of such disturbances are detected by the scale much later, namely then when the subsets to be weighed get lighter and lighter. Then, the scale tries to change the parameters, which control the product supply, to counteract a product shortage. Sometimes that leads to the solution of the problem, however, much later after the occurrence per se and with the consequence of a general disturbance of the supply system, which normally works well. Fluctuations in the performance and in the accuracy of the scale are the result.

This can however also lead to much severe consequences even to the impossibility of finding a combination in the combination scale, to frequent re-dosings, over-fillings, throwing-offs and performance shutdowns or the complete stand still. Then, a manual intervention is necessary and it takes a certain time, until the scale finds back to the usual rhythm.

To guarantee a trouble-free procedure, additional information about the nature and distribution of the product at certain locations or areas within the devices is therefore frequently required. Thereby, a plurality of sensors is provided, which enable to capture for example the distance, the colour, the velocity, different material characteristics etc. with different measuring principles. This information usually relates to a measuring point or a measuring area.

According to the gained information, decisions about the further proceeding of the monitored process can be made, data regarding the single processes, for example about their state, tendency or efficiency can be determined. Especially information about the fact how much product of which type is present at an observed location, depict the "IS"-state of a process. Different control algorithms, suitable for the requirements and aims, can then be used. In this way, a controllable process should be ensured.

Such sensors, for example so-called 3D-sensors, are indeed generally known, so for example from the documents U.S. Pat. No. 8,350,847 B2, U.S. Patent Application Publication 2012 075 534 A1, U.S. Patent Application Publication 2011 292 036 A1 or U.S. Patent Application Publication 2012 056 982 A1. However, dependent on the area to be observed, a plurality of these sensors is needed. The number of sensors depends especially on the fact which measuring area they detect in the single case and how many partial areas are really of interest within the total area to be observed by the entirety of sensors. At a fixed number of fixed localized partial areas, the respective number of sensors has then to be used, each partial area therefore requires a separate sensor. In the case of a change of the number or the localization of those partial areas, new sensors have to be used, or the existing sensors have to be repositioned.

This procedure is expensive and complicated. Furthermore, an increased time consumption for installing and setting the sensors is required.

It is therefore an object of the invention to avoid at least one of the mentioned disadvantages and to enable an improved product filling.

SUMMARY OF THE INVENTION

This object is solved according to the invention via a device and via a method.

According to one aspect of the present invention, a filling device, especially for a weighing device, comprises a transport area, which is supplied with products by a loading means, at least one sensor for capturing and forwarding of product occupation information on the transport area. Furthermore, a control means is provided in the filling device, wherein the at least one sensor is formed to capture at least one partial area of the transport area, and the control means is formed to divide the area captured by the at least one sensor virtually into a multiplicity of sectors. That means that the sensor can capture two or more independent partial areas. As it will be shown later, one or more sectors can further be divided in zones.

The sectors or the zones can arbitrarily be determined. Alternatively, these can also be assigned to predetermined sections of the filling device, as further described later in detail.

In some embodiments of the invention, the product occupation information can be an area coverage of the transport area or a part of the transport area. However, in some embodiments, the product occupation information can also be a product volume, which is related to a sector, a zone and/or the captured area or partial area.

Thus, the whole transport area can only be captured with one sensor in an ideal case. This can reduce the costs of a filling device. This can also enable a simplified installation of the filling device.

Such a sensor works by detecting a coordinate information (x, y, z) for each measuring point, wherein (x, y) can determine a position on the filling device, and (z) can represent a depth information, that means a distance measurement.

The filling device can in some further developments also comprise one or more transport grooves. This applied product is transported in the transport grooves for further use. The transport happens normally passively, that means for example via the weight of the supplied products themselves, which for example move along the groove from one end of the transport grooves to another end, driven by gravitation. The refilled product at the supply end of the transport groove thereby pushes the upstream product further to the other end of the groove.

Furthermore, a distribution device can be provided. This can for example be formed as a distribution plate. The distribution device can for example be provided rotatably around a rotation axis in some embodiments, wherein it is formed stationary and not rotatable in other embodiments. In some further embodiments, the distribution device can be further adjustable in a vertical direction and/or supported in a way that a vibration of the distribution means is enabled. Furthermore, it is conceivable in some embodiments that the whole transport area is supported in a way that it can be brought to a vibration.

In some embodiments, at least one of the sectors or at least one of the zones is congruent to one transport groove. Furthermore, at least one of the sectors or at least one of the zones can be congruent to a part of the distribution device.

In this way, the whole transport area can be captured with one or with few sensors, and a plurality of the desired detection sectors can be captured simultaneously with the same sensor. In this way, an analysis of the predetermined transport paths, preferably thus of the respective transport grooves or the desired areas of the distribution device, can be performed in a simple manner.

The sectors can thereby be divided in single zones. In this way, an even more detailed analysis of the transport paths can be performed, in order to, for example, identify an error location within a sector containing errors.

In some embodiments the control device is especially formed in a way that the respective sectors and/or the respective zones are divided with Cartesian coordinate-sectors. Those coordinates are preferably coordinates relative to the sensor position. In some embodiments, the coordinates can, however, be indicated also relative to another, predetermined position. The coordinates can in one embodiment also be polar coordinates or other characteristic information, which allow the determination of the position in space.

By providing of coordinate sectors, a clear, easily capturable division of the transport area can be enabled. In this way, a quick error detection can be enabled. This can support the productivity of the device.

Furthermore, a display means can be provided in some embodiments, which enables displaying the filling device or at least the transport area. Thereby, the sectors or the zones or at least a part of the sectors or the zones can be displayed on the display means. The respective sectors or zones can additionally or exclusively be displayable with a coloured presentation or a coloured superposition. In this way, a quicker error identification can be enabled.

The respective sectors or the provided zones in the respective sectors are advantageously assigned to a respective colour, which is only used once, on the display means, so that an identification of a sector or a zone with a colour is unambiguous. That means that the control means assigns a certain colour information to each sector or each zone. This colour information can for example be provided in the RGB-system.

In this way, the colour information (R=250, G=50, B=0) could for example be assigned to one sector, for example a first groove bottom, while the colour information (R=250, G=50, B=0) is assigned to another sector. Furthermore, the first sector could be divided into zones, wherein one zone could be provided with the colour information (R=250, G=50, B=0) and a further zone with a colour information (R=250, G=60, B=0), etc. In this way, besides the information captured by the sensor with regard to the coordinates (x, y, z), a further simple assignment to a certain area, that means sector or zone, could be enabled.

Thus, all points with the same colour information can be evaluated at the evaluation of the depth information of the 3D-sensor, and an average value can be found, which reflects the product occupation of this section.

Of course, another assignment is possible, as long as the single sectors or the single zones are unambiguously defined. In this way, only a fourth coordinate (n) could be added, which displays an assignment to a certain section.

In some embodiments it is also possible that a display of the sectors and/or the zones changes, for example by changing from a non-coloured to a coloured display or a change of the intensity or brightness of at least one part of the display and at least temporarily. This change of the display can also be performed by any other means, which enables an accentuation of one sector or one zone.

The change of the display can be changed due to product occupation information. In this way, a volumetric flow, passing through a transport groove, can for example be captured. A soon as a discontinuity from one zone to another zone occurs, a respective announcement can be displayed. In this way, a quicker error identification, for example a blocking of the transport groove, can be performed.

Analogously, a change in the volumetric flow within a transport groove could be determined, what could be caused by a wrong filling.

All of this can allow to recognize early function limitations of the filling device. This could help to increase the productivity of the device.

In some embodiments, the filling of the transport area, especially the filling of each sector or each zone, can be quantified. In this way, an absolute determination of the volume, which is occupied by the product, can be performed within a section. This can be done for example by integration of the determined occupation for the respective section, that means by the z-values captured by the sensor.

Thereby, also product properties like geometry, porosity, or the like can be considered, to be able to perform a determination of the product occupation as exact as possible.

By calculating the product occupation in one section, the depth information of all points with the same colour information are considered in some embodiments.

Because of the measuring principle and the existing environment influences, the values underlie a fluctuation, which can be enormous. Even directly adjacent points can have considerable differences. To increase the reliability of the information content, the control means can additionally comprise a filter in some embodiments to smooth the product occupation information captured by the sensor.

This can for example be performed with a filter algorithm. This filter algorithm can consider one or more adjacent measuring points for one certain measuring point $p(x,y)$ in some embodiments and can form a weighted average value based on this. A potential algorithm for the calculation of an average value, which is applied in some embodiments, can be expressed in the following:

$$mpw(x,y)=wp(x,y)+k1*[wp(x-1,y)+wp(x+1,y)+wp(x,y-1)+wp(x,y+1)]+ \ldots +k2*[wp(x-1,y+1)+wp(x+1,y+1)+wp(x+1,y-1)+wp(x-1,y-1)]$$

wherein $mwp(x,Y)$ is the weighted average value for the measuring point $p(x,y)$, $wp(x,y)$ is the value for the measuring point $p(x,y)$ and $k1$, $k2$ are weighting factors. The expression $(x-1,y)$ thereby represents the measuring point, which lies in the direction of the abscissa, that means in the positive direction in a Cartesian coordinate system, in front of the point with the coordinate (x, y). Similar is valid for the expressions (x+1,y), (x,y−1) or (x,y+1).

Furthermore, the control means can be formed in a way to examine the measuring values for plausibility. This can for example be a comparison of information of adjacent measuring points. Thereby, for example discontinuities between the measuring points could be determined.

In some embodiments, sections can be also defined for this, within which the measuring values have to be located to be considered for further calculations. Potential±deviations are defined as section limitations. Values outside of those sections could then be ignored.

Furthermore, in some embodiments a recursive filter algorithm for filtering of temporarily outlying measuring values can be applied, which can be expressed as follows:

$$fwp(x,y,t)=[q0*mwp(x,y)+q1*fwp(x,y,t-1)+ \ldots +qd*fwp(x,y,t-d)]/[q0+q1+ \ldots +qd),$$

wherein fwp (x,y,t) represents the filter value around the point p(x,y) at a determined time t, and q0, ... qd are weighting factors for the other values to be considered.

In the above considerations, the determined depth information with regard to the measuring point (x, y) or the assigned section, here a section or a zone, are named as the "value".

For the whole area, for example the whole zone, a zone average value can be formed as arithmetic average value of all points fwz (i, j, t) belonging to the zone, wherein i expresses the sector, j expresses the zone and t is the most recently considered value.

In such an embodiment, the calculated value also represents an average product occupation height and is a measure for the product volume. If the area of the respective section is known, the respective volume can be calculated based on this.

In some embodiments of the invention, the filling device further comprises a storage device. Therein, position information of the captured transport area can be stored. This position information can for example contain the coordinates of at least one reference point. This reference point can be an arbitrary point, preferably a point easy to capture, of the filling device. Such a reference point could for example be a middle point of the transport area, a middle point of the distribution device, a predetermined point at the periphery of the device or the like.

By the thus known position of the sensor relatively to the filling device, a more exact determination of the height of the product occupation can be enabled via the depth information.

Furthermore, the storing of the position of the reference point can enable reaching a more rapid alignment of the sensor, for example after its adaptation or realignment. Furthermore, it can be enabled, that prior to or while the operation of the filling device, a check of the alignment of the sensor is performed. Thereto, various reference points can also be considered for the case that one or more of the reference points are not capturable, for example because of a coverage by the product. In this way, a reliability of the device can be increased.

In some embodiments it is conceivable that the sensor is re-adjusted with respective re-adjusting means, due to a comparison between the actual position of a reference point and a stored position thereof. In this way, a calibration of the filling device can be performed. This can in turn increase reliability of the device.

In some embodiments, more sensors can be provided. This can for example be necessary, if a sensor cannot capture the whole relevant transport area. A second sensor can, however, also be provided as a redundant system, to replace a primary sensor in the case of an error. Furthermore, a second sensor can be used to check the results of the first sensor or to provide a further measurement of the same section. Insofar, a second sensor can be especially arranged in a way that the area captured by the second sensor overlaps at least partially with a captured area of the first sensor.

In this way, a precision of the device can be increased. More sensors can be used, if the respective circumstances require this.

In some embodiments, the control device can be designed in a way, that a value for a basic occupation, that means a neutral position, is predetermined for a sector or for a zone and/or is stored in the storage. In this way an empty value, that means a value which is assigned to an empty section, can be corrected, for example in a case, in which product has adhered in the section and is not transported further. In this way, especially a determination of the actually transported volumetric flow through the respective sector can be improved. Therefore, this can also lead to an improved filling process of the transport area.

Thus, with the device according to the first aspect, a detection of the product occupation on a transport area is possible, which is normally an uppermost portion of a filling device. This allows detecting gaps or strong fluctuations of the product occupation on the transport area in time, especially in the transport grooves, and respective counteractions can be performed before an escalation of the situation can occur.

Further, blockings of single transport grooves due to product accumulations or adhesions can be detected in time, and respective counteractions can be performed, before an escalation of the situation can occur. Further, the product amount and product distribution on the distribution device can be detected and the loading device can respectively be controlled. The single sections, that means sectors and/or zones, can thereby be easily defined, enlarged or adapted in another way.

According to a second aspect of the present invention, the weighing device comprises a filling device according to the first aspect. The weighing device can be a combination scale in some embodiments.

According to a third aspect of the present invention a process is provided for capturing of the filling process of a weighing device, especially a combination scale. The process thereby comprises a step for filling of a transport area of a filling device with one or more products by means of a loading device. A further step is a division of the transport area in a multiplicity of sections, sectors and/or zones in the sense of the invention. Furthermore, a detection of at least one partial section of the transport area with at least one sensor and a determination of the product occupation for at least one predetermined sector or at least one predetermined zone, is performed by means of the sensor. In a further step, at least the one sector (121, 122; 111, 112) or at least the one zone (121A, 121B, 121C) is displayed, and further or alternatively a product occupation information related to the sector or zone is displayed on the display means.

In this way it can, for example, be enabled to detect an actual filling situation. This can also be performed in real time or nearly in real time. Further, it is possible to capture changes in the filling behaviour or in the product transport over a certain time span. This can be performed via repeated measurements in continuous or discontinuous intervals. This can also allow to determine an expected value, that means a value which corresponds to an expected product amount which shall be transported in the determined time span through a sector or a zone. This in turn can increase a functionality of the respective device.

In some embodiments of the invention, the division of the sections, that means the sectors or zones, can be performed by means of cartesian coordinates.

Further, a display of the sections or part of the sections by means of a coloured presentation and/or a coloured superposition can be performed on the display means. Such a colouring can be done, for example, in the control means with the help of a graphic editor or the like, which can be provided in the control means.

It should be noted that a product filling process is always a three-dimensional filling in the sense of the invention, as the supplied products have always a three-dimensional extension. Insofar, if the sectors determined by the coordinates are the topic, always the volume of a room part is looked at with regard to the product filling process, which comprises the area determined by the coordinates as basic area.

Furthermore, the room volume is limited on the sides by the virtual connection lines, extending from the coordinates to the sensor or the reference point, which form the edges of the side areas of the room volume. Thereby, also the form of the transport area can be considered when calculating the actual volume, which is normally no geometrical area, but rather a respectively structured surface, provided with transport grooves.

It is further clear that this invention also comprises embodiments which represent a combination of one or more of the above-mentioned embodiments.

BRIEF DESCRIPTION OF THE DRAWINGS

These and further advantages, developments and details of the invention will be exemplified in the following with regard to the figures. Identical or similar members are thereby presented in the figures by the same reference signs, and a repeated description thereof is omitted.

Thereby, it is shown:

FIG. 5 A filling device according to one embodiment of the invention;

FIG. 6 An x, y, z diagram for coordinate transformation in a filling device according to the invention.

DETAILED DESCRIPTION OF THE INVENTION

Figure 1:
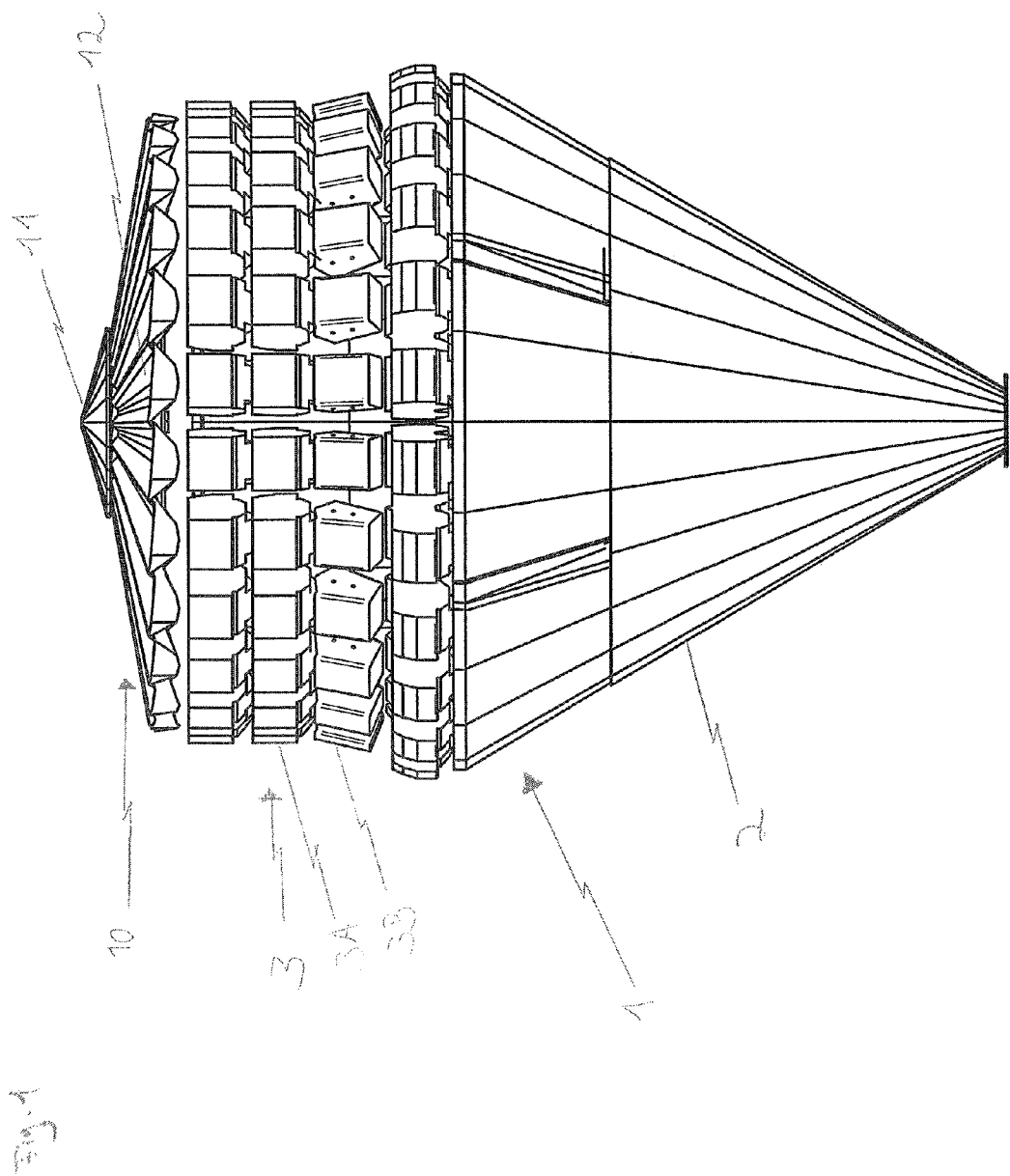
FIG. 1 A perspective representation of a filling device according to one embodiment of the invention with a weighing device.

FIG. 1 shows a weighing device 1. The weighing device 1 according to the presented embodiment is a multi- or combination scale. The weighing device 1 has a basically funnel-shaped structure 2, which is followed by a cylindrical section 3 in a vertical direction upstream. The cylindrical section 3 comprises a multiplicity of guide- and weighing elements 3A, 3B. The kind and the arrangement of these elements 3A, 3B are known by the person skilled in the art and are therefore not described in detail here.

Figure 2:
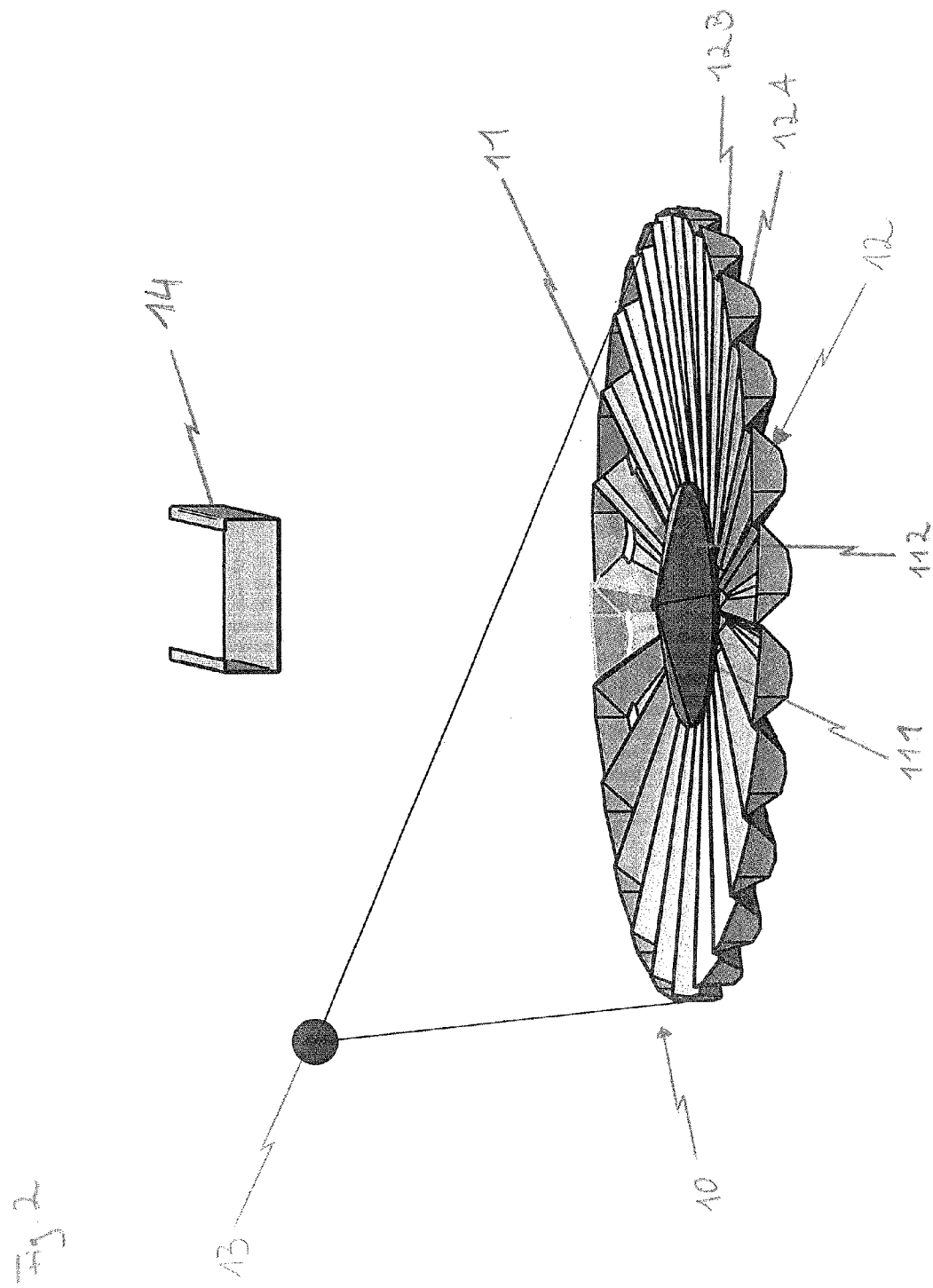
FIG. 2 A perspective representation of a filling device of one embodiment according to the invention.
Figure 3:
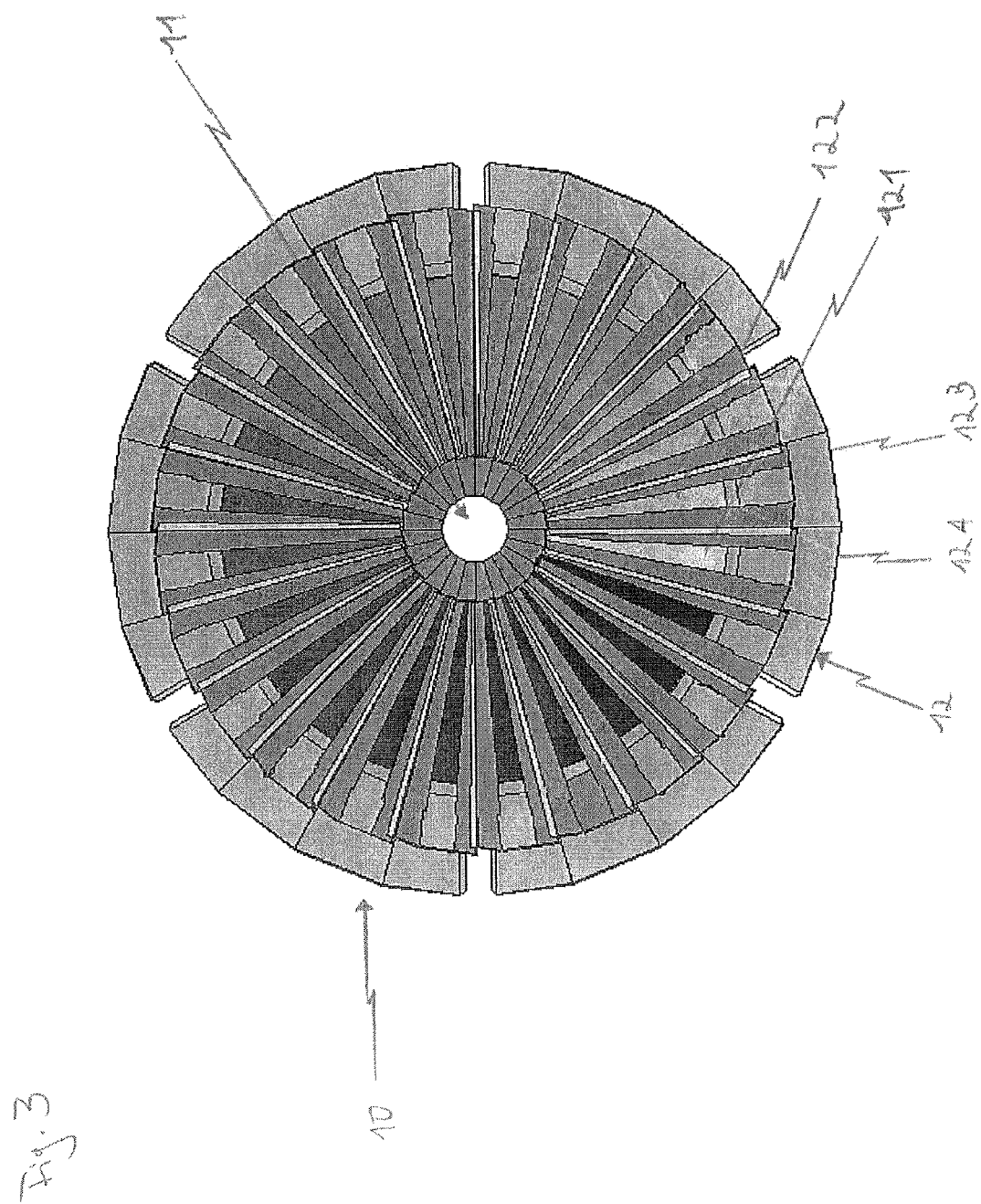
FIG. 3 A top view on a filling device according to the invention with different presented sectors.

Further in vertical direction, in a section 2 averted to the funnel-shaped section of the cylindrical section 3, a filling device 10 is arranged. As shown in FIGS. 2 and 3, the filling device 10 comprises a transport area 12, which is basically formed disk-shaped.

In turn, the transport area 12 comprises a multiplicity of transport grooves 12A, 12B, etc. The transport grooves 12A, 12B extend in a radial direction in a disk-segment-shape from the direction of a center to the circumference, i.e. the periphery, of the transport area 12. The transport grooves 12A, 12B are thereby formed deepened relative to the surface of the transport area 12. In this way, they form grooves, which allow a directed transport of products on the transport area 12. Thereby, the transport groves 12A, 12B are further formed in a radial direction from a center of the transport area to the outside towards the periphery tapered downwards, to support a transport of product along the groove. An inclination is, however, not compulsory and can also be provided in a reverse direction.

The filling device 10 further comprises a distribution device 11 in a central sector of the transport area. The distribution device 11 has, as in turn recognizable from FIGS. 2 and 3, a disk-shaped basic shape, wherein a center of the distribution device 11 is elevated relatively to the circumference thereof. Therefore, the distribution device 11 has a funnel-shape, with a funnel opened in the direction of the transport surface 12. The distribution device can, like in the present case, for example, be formed as a distribution plate and comprise a non-structured surface. Further, the surface can be provided with a structure, for example with projecting edges or the like.

As obvious from FIG. 2, the filling device 10 further comprises a sensor 13. The sensor 13 is provided dislocatedly in a vertical and a horizontal direction relatively to the filling device, so that the sensor 13 can capture the transport surface.

Further, the filling device 10 comprises a loading device 14. The loading device 14 is arranged dislocatedly vertically to the distribution device 11. In this way, a product feeded from the loading device 14 can come directly onto the distribution device 11 and from there into the transport grooves 12A, 12B.

According to the invention, the area captured by the sensor 13, preferably the whole transport area 12 and the distribution device 11, can be divided in different sections, sectors and zones. FIG. 3 shows a top view on a transport area 12. Thereby, a possible division of the transport area into sectors 121, 122, etc. is presented. In the shown embodiment, the positions of the sectors 121, 122, etc. are congruent to the positions of the transport grooves 12A, 12B.

Figure 4:
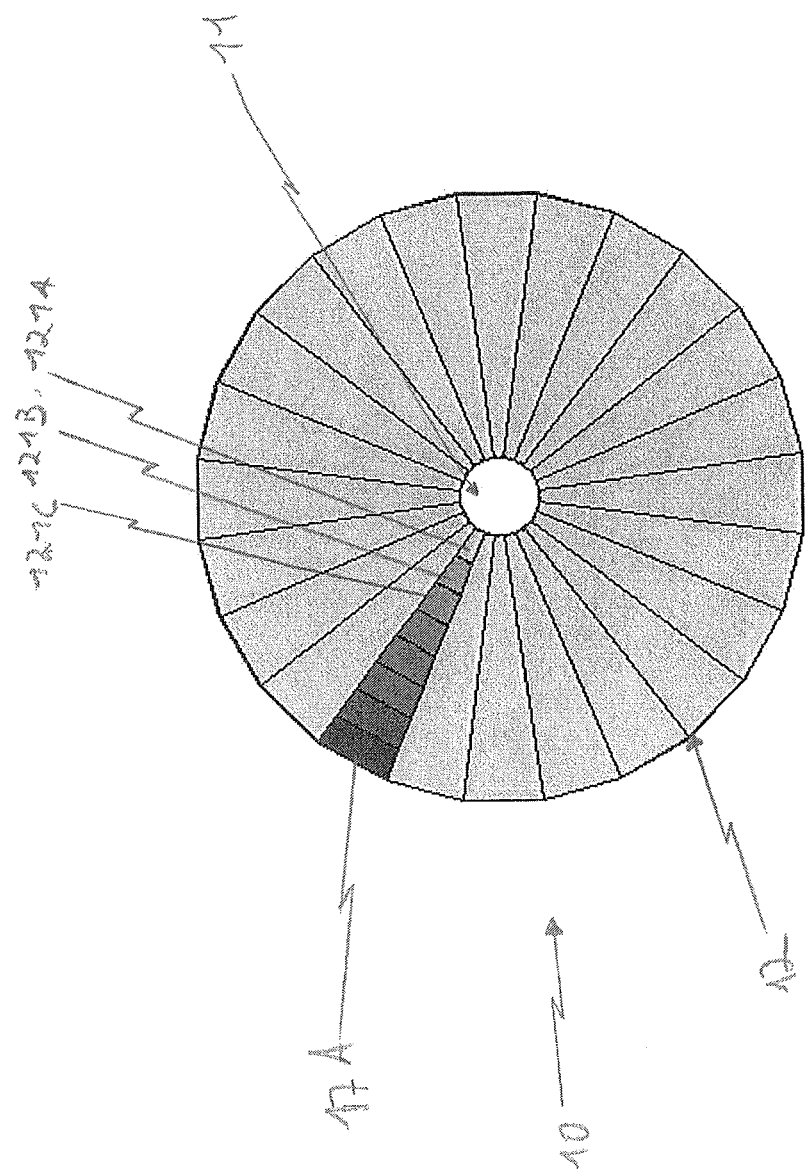
FIG. 4 A schematic presentation of a transport area of a filling device according to the invention in top view with different presented zones.

Similarly, FIG. 4 represents a schematic representation of a transport area 12 in top view. Thereby, the division of a sector, here presented as a transport groove 12A, into different zones 121A, 121B, 121C, etc., is presented. In the embodiment shown here, all zones have the same dimensions in radial direction. Consequently, the areas of the single zones differ from each other. It is further possible that the zones are formed independently from each other or, for example, with the same area.

Furthermore, it is also conceivable that the sectors are formed independently from each other and zones and/or sectors are formed arbitrarily.

Furthermore, like obvious from FIG. 1, the area of the distribution device 11 can be divided in different sectors 11A, 11B, etc. These sectors can, for example, represent a fourth of the distribution device, respectively.

In this way, a continuous capturing and monitoring of the product filling process can be performed throughout the whole filling device 10 during a filling process.

FIG. 5 shows a further embodiment of the present invention. This one differs from the previously described embodiment by providing a second sensor 23, which is aligned at a position dislocatedly from the first sensor 13. This enables to capture parts of the filling device even then, if the sensor 13 cannot perform this due to constructional circumstances or other reasons. Thereby, the capture areas of the sensors 13, 23 largely overlap each other in the present case. Thereby, a redundancy while measuring can be created, for example in order to obtain more precise values or to reduce a failure probability of the sensor measurement.

Furthermore, a position of the center of the distribution plate can be seen in FIG. 5, which simultaneously represents the position of the center P of the transport area 12. This position P can, for example, serve as a reference point for a gauging measurement, a calibration or check of the function of the sensor.

FIG. 6 shows an x,y,z-diagram for the coordinate transformation in a filling device according to the present invention. Thereby, a position S of the sensor 13 is determined in room coordinates $S(x_0,y_0,z_0)$. Each determined measuring area, that means a sector 121, 122, etc. or a zone 121A, 121B, 121C, etc. is determined by a multiplicity of measurement points $M_1, M_2, M_3, M_4, \ldots, M_i$. As the sensor 13, 23 is dislocated with regard to the respective measuring area, further an inclination of the measuring area relative to the sensor has to be considered. A position $M_i(x_i,y_i,z_i)$ of a point in the section is therefore also determined by an angle $\alpha$. The angle $\alpha$ is thereby the angle, which a direct connection between the sensor and the measuring point $M_i$ forms with the connection of the point $M_i$ with a point, on which a projection of the sensor into the plane of the respective measuring area lies. In this way, an exact distance determination and nearby an exact determination of the product filling in the respective measuring section, that means the measuring volume, can be determined under consideration of the parallaxe effect.

In conclusion, a filling device 10, especially for a weighing device, comprises a loading device 14 for the feeding of products, a transport area 12, which is supplied with products by the loading device 14, at least one sensor 13, 23 for capturing and forwarding of product occupation information on the transport area 12, as well as a control device. The at least one sensor 13, 23 is thereby formed to at least capture one partial area of the transport area 12, and the control means is formed to divide the area captured by the at least one sensor 13, 23 virtually into a multiplicity of sectors 121, 122; 111, 112. Furthermore, a method is shown for performing of a monitoring and capturing of a filling process of a filling device 10.

What is claimed is:

1. A filling device of a weighing device for improving a filling process, the filling device comprising:
   a controller;
   a loading device controlled by the controller;
   a transport area for receiving a plurality of products from the loading device; and
   a first sensor for directly capturing a volumetric occupancy of the plurality of products in a first capture area of the transport area as a product occupation information and forwarding the product occupation information to the controller;
   wherein the controller divides the first capture area of the transport area virtually into a plurality of sectors for easier identification of a blockage in the transport area based on the product occupation information and performs counteractions against the blockage to improve the filling process by controlling the loading device;
   wherein the first sensor is the only sensor for directly capturing a volumetric occupancy of the plurality of products in the entire first capture area of the transport area as the product occupation information and forwarding the product occupation information to the controller.

2. The filling device according to claim 1, wherein the transport area comprises a plurality of transport grooves or a distribution device.

3. The filling device according to claim 2, wherein a sector of the plurality of sectors is congruent with a transport groove of the plurality of transport grooves or a sector of the plurality of sectors is congruent with at least one part of the distribution device.

4. The filling device according to claim 1, wherein the controller further divides a respective sector virtually into a respective plurality of zones.

5. The filling device according to claim 4, wherein the controller divides a respective sector of the plurality of sector the sectors or a respective zones of the respective plurality of zones according to Cartesian coordinates relative to the sensor.

6. The filling device according to claim 4, further comprising a display for displaying at least one sector of the plurality of sectors or at least one zone of the plurality of zones in color.

7. The filling device according to claim 6, wherein a predetermined color is assigned to each sector or each zone on the display.

8. The filling device according to claim 4, wherein the first sensor quantitatively captures a filling of the transport area, a filling of each sector of the plurality of sectors, or a filling of each zone of the plurality of zones.

9. The filling device according to claim 1, wherein the controller further comprises a filter for smoothing the product occupation information captured by the sensors.

10. The filling device according to claim 1, further comprising a storage device for storing of position information captured on the transport area, the position information comprising at least one predetermined reference point.

11. The filling device according to claim 1, further comprising a second sensor having a second capture area of the transport area, the first capture area and the second capture area overlapping each other.

12. A combination scale comprising:
   a filling device for improving a filling process, the filling device comprising
   a controller;
   a loading device controlled by the controller; and
   a transport area for receiving a plurality of products from the loading device;
   a first sensor for directly capturing a volumetric occupancy of the plurality of products in a first capture area of the transport area as a product occupation information and forwarding the product occupation information to the controller;
   wherein the controller for dividing the first capture area of the transport area virtually into a plurality of sectors for easier identification of a blockage in the transport area based on the product occupation information and to perform counteractions against the blockage to improve the filling process in the combination scale by controlling the loading device;

wherein the first sensor is the only sensor for directly capturing a volumetric occupancy of the plurality of products in the entire first capture area of the transport area as the product occupation information and forwarding the product occupation information to the controller.

13. A method for improving a filling process of a filling device, the filling device comprising
    a loading device;
    a transport area for receiving a plurality of products from the loading device;
    a single sensor for directly capturing a volumetric occupancy of the plurality of products in a capture area of the transport area as product occupation information and forwarding the product occupation information; and
    a controller for dividing the capture area of the transport area virtually into a plurality of sectors for easier identification of a blockage in the transport area based on the product occupation information and for performing counteractions against the blockage to improve the filling process by the filling device;

the method comprising the steps of:
    (a) filling of the transport area with a product;
    (b) dividing the transport area into a plurality of sectors or a plurality of zones;
    (c) capturing of at least a partial sector of the transport area with the sensor;
    (d) determining of the product occupation information for at least one predetermined sector or one predetermined zone by the sensor;
    (e) displaying of the at least one sector or the at least one zone;
    (f) outputting of the product occupation information specific for the one predetermined sector or the one predetermined zone on a display; and
    (g) performing, by the controller, counteractions against the blockage to improve the filling process by the filling device by controlling, by the controller, the loading device.

14. The method according to claim 13, wherein step (b) is performed relative to the first sensor using Cartesian coordinates.

15. The method of claim 13, wherein step (e) or step (f) is performed according to predetermined color specification on the display.

16. The filling device according to claim 12, wherein the transport area comprises a plurality of transport grooves or a distribution device.

17. The filling device according to claim 16, wherein a sector of the plurality of sectors is congruent with a transport groove of the plurality of transport grooves or a sector of the plurality of sectors is congruent with at least one part of the distribution device.

18. The filling device according to claim 12, wherein the controller further divides a respective sector virtually into a respective plurality of zones.

19. The filling device according to claim 18, wherein the controller divides a respective sector of the plurality of sector the sectors or a respective zones of the respective plurality of zones according to Cartesian coordinates relative to the sensor.

20. The filling device according to claim 12, further comprising a second sensor having a second capture area of the transport area, the first capture area and the second capture area overlapping each other.

* * * * *